Sept. 3, 1968 W. E. MIZE 3,399,450
METHOD AND APPARATUS FOR JOINING STRIP ENDS
Filed Sept. 11, 1964 4 Sheets-Sheet 1
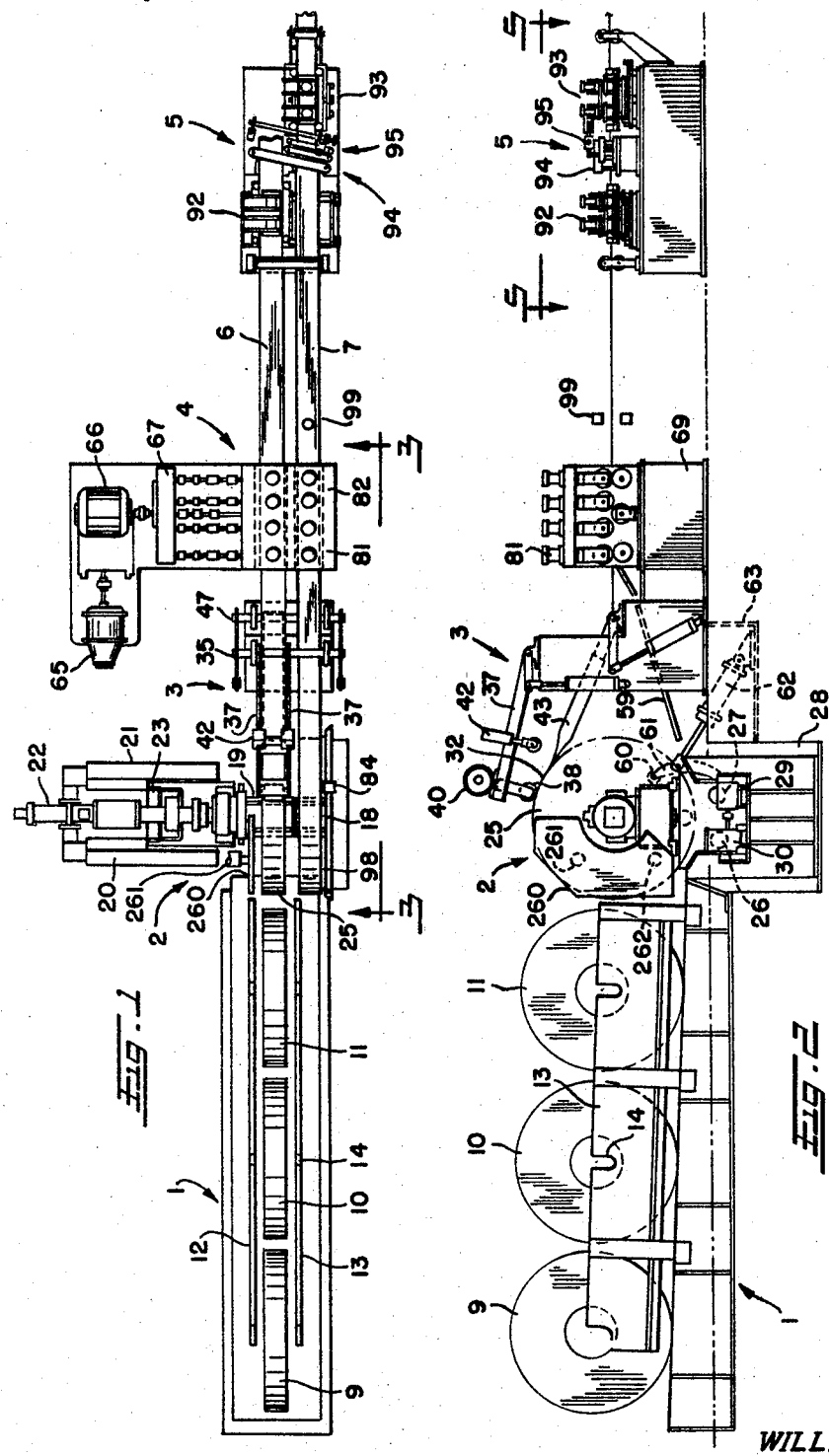
INVENTOR.
WILLIAM E. MIZE
BY
Oberlin, Maky & Donnelly
ATTORNEYS

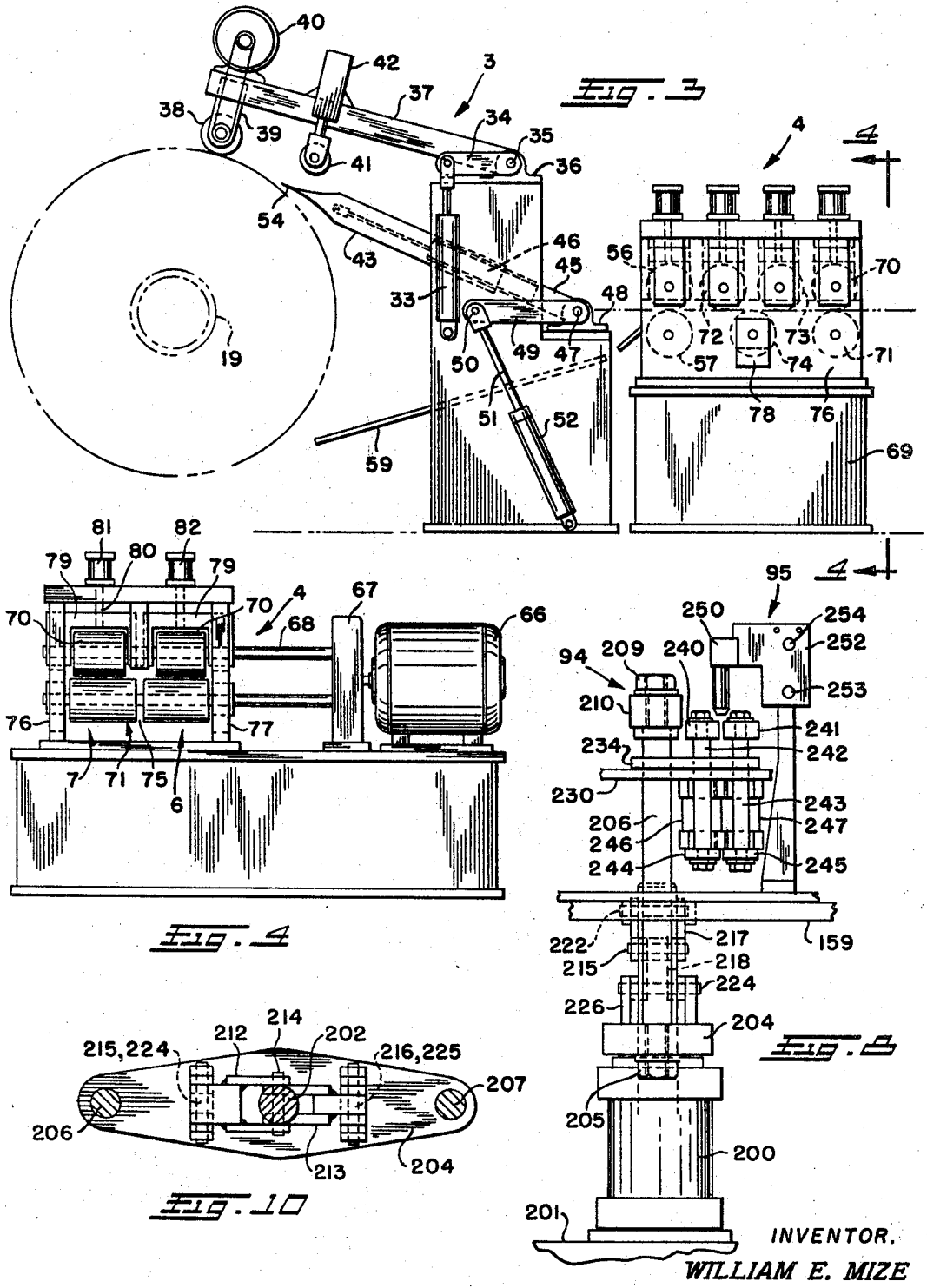

Sept. 3, 1968
W. E. MIZE
3,399,450
METHOD AND APPARATUS FOR JOINING STRIP ENDS
Filed Sept. 11, 1964
4 Sheets-Sheet 3
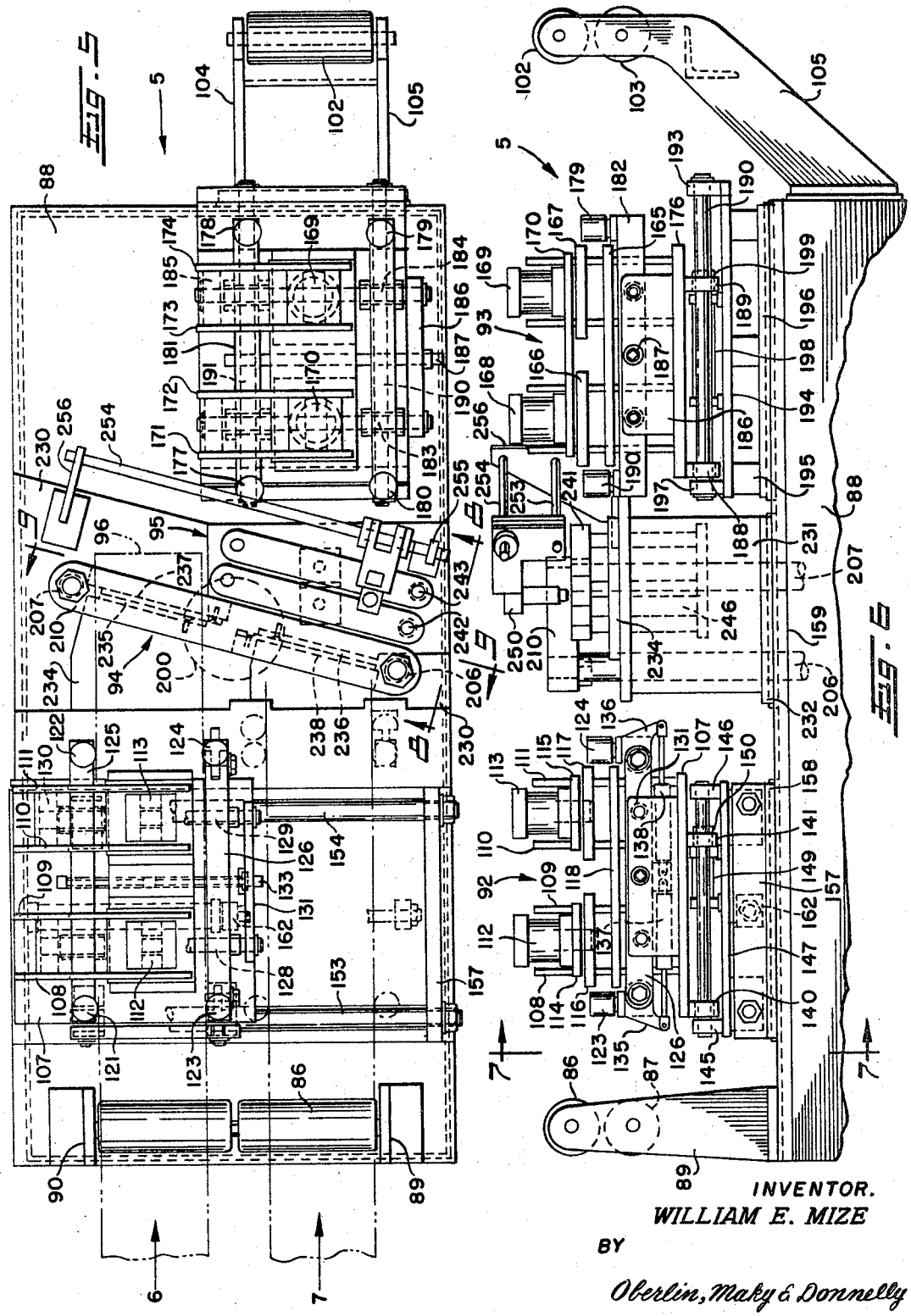
INVENTOR.
WILLIAM E. MIZE
BY
Oberlin, Maky & Donnelly
ATTORNEYS

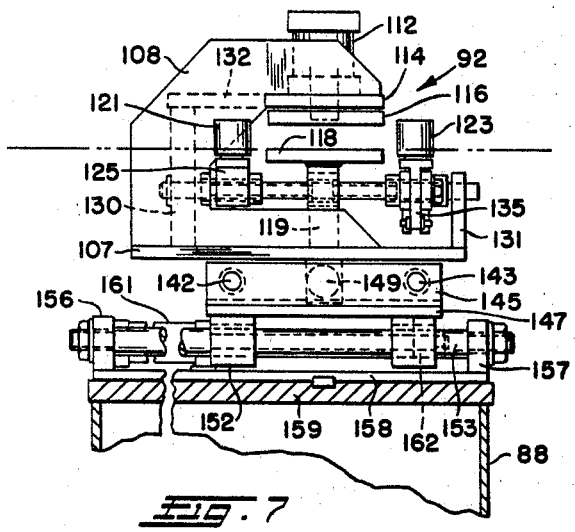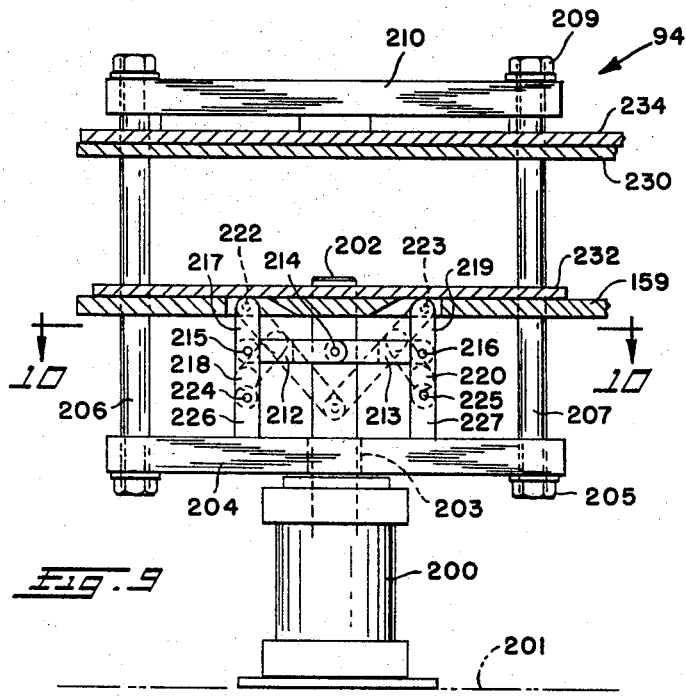

United States Patent Office 3,399,450
Patented Sept. 3, 1968

3,399,450
METHOD AND APPARATUS FOR JOINING STRIP ENDS
William E. Mize, Parma Heights, Ohio, assignor to The Yoder Company, Cleveland, Ohio, a corporation of Ohio
Filed Sept. 11, 1964, Ser. No. 395,847
28 Claims. (Cl. 29—482)

ABSTRACT OF THE DISCLOSURE

Strip joining apparatus utilizing a stand-by line laterally adjacent the processing line with a peeler in the stand-by line and an open throated flattener for both lines; and a strip joining apparatus severing the strip in both lines and indexing the severed ends to be joined, the latter including means to shift the strip in the stand-by line including the coil to the processing line.

---

This invention relates generally as indicated to a method and apparatus for joining strip ends and more particularly to a process and apparatus therefor in which leading ends of strip material can be joined to trailing ends of such strip material in the continuous processing thereof in a much more expeditious manner.

In lines for processing metal, plastic, paper, and like strip material, it has always been a problem to feed the material, usually in coil form, into the continuous processing machinery. If the machinery is to be operated continuously, a looping mechanism is usually provided for storage within the loop of enough length of the strip material to permit continued feeding to the machine while the end of the coil being processed is stopped and joined to the next coil. By the time the leading and trailing ends have been joined, the material within the loop has been fed into the machine, but is subsequently built up again usually by power driven equipment before the end of the coil is reached. Since many mills today operate at extremely high linear speeds, it can be seen that large capacity loops are required to permit continuous operation and such loops are, of course, quite space consuming. It will thus be seen that if the joining of the strip ends can be accomplished in a very short time, the loop capacity may be reduced or conversely, the mill speeds may be maintained at the high speed desired. Thus the time allowed for the joining of the strip ends is a function both of the loop capacity and the mill speed.

It is accordingly a principal object of the present invention to provide both a method and apparatus for markedly reducing the time required to join strip ends in continuous strip processing lines.

It is another principal object to provide a method and apparatus for joining strip ends in a completely controlled manner avoiding the necessity of manual handling.

Another object is the provision of a process and apparatus for joining strip ends in which the strip material will be subject to as little damage as possible.

Yet another object is the provision of apparatus for joining strip ends in an expeditious manner which will permit continuous processing lines to operate at higher speeds.

A still further object is the provision of a method and apparatus for continuous strip processing lines permitting the strip ends to be joined more readily thus increasing the efficiency of the mill and reducing the amount of looping equipment normally required.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a fragmentary top plan view of the entry end of a continuous strip processing mill line embodying the present invention;

FIG. 2 is a fragmentary side elevation of the apparatus shown in FIG. 1;

FIG. 3 is an enlarged side elevation of the peeler mechanism for the uncoiler and the flattener unit;

FIG. 4 is an end elevation of the flattener unit as seen from the line 4—4 of FIG. 3;

FIG. 5 is an enlarged fragmentary top plan view of the shear and end welder unit of the present invention as seen from the line 5—5 of FIG. 2;

FIG. 6 is a fragmentary side elevation of such unit as seen from the bottom of FIG. 5;

FIG. 7 is a fragmentary vertical section taken substantially on the line 7—7 of FIG. 6 illustrating in end elevation the leading end strip clamping and indexing mechanism;

FIG. 8 is an enlarged side elevation of the strip shear and welding apparatus taken substantially on the line 8—8 of FIG. 5;

FIG. 9 is a vertical section showing in end elevation the shear mechanism taken substantially from the plane of line 9—9 of FIG. 5; and FIG. 10 is a horizontal section taken on the line 10—10 of FIG. 9.

While the present invention in its illustrated embodiment finds particular utility in metal processing machinery such as cold roll forming machines, pipe mills, tube mills, metal strip brushing, pickling, coating, or annealing lines, it will be appreciated that the present invention may also be used in any strip processing line for materials such as paper, plastic, or other types of webs. In this manner, the illustrated units which apply particularly to metal strip, may be omitted or equivalent units substituted therefor depending upon the type of material being joined. For example, in lieu of the welding unit illustrated, stapling, stitching, or adhesive joining equipment may be employed.

Referring now to the annexed drawings and more particularly to FIGS. 1 and 2, there is illustrated the leading end of a continuous metal strip processing line which includes, reading from left to right, a coil ramp 1, an expansible mandrel unit 2, a peeler unit 3, a leveler 4, and a shear and end welder unit 5. As can be seen more particularly in FIG. 1, the units 2, 3, 4 and 5 are of special design to accommodate side-by-side parallel strip lines which may be designated at 6 and 7 and termed the stand-by line and mill run line, respectively. The mill run line 7 is aligned with the processing mill and looping equipment which is to the right of the illustrated machinery shown in FIGS. 1 and 2.

The loading ramp 1 contains storage facilities for three coils of strip material illustrated at 9, 10 and 11 and side plates 12 and 13 having notches 14 in the top edges thereof may be employed to confine the coil to roll down the ramp 1 to the uncoiler unit 2. Such coils will normally be placed on the loading or storage ramp by means of overhead cranes, lift trucks, and like coil handling equipment and the notches 14 may provide clearance for the crane hook. In the illustrated embodiment, the coils being fed to the line may comprise metal strip approximately ¼" thick by 12" wide and such coils may have an O.D. of about 72" and an eye or center opening therein having a 20" I.D. The coils are usually held in such coil form by metal banding which can be removed once the coils are placed in the uncoiler unit 2. Baffles may be opened and closed to allow the coils to move from one station to the next in conventional manner.

The uncoiler unit 2 comprises two expansible mandrels 18 and 19 each of which in conventional manner includes radially movable gripping shoes which can be expanded firmly to grip the inside surface of the eye of the coils. Both of the mandrels 18 and 19 may be rotatably power driven and the mandrel 19 is axially movable along gibs 20 and 21 at the direction of a hydraulic piston-cylinder assembly 22. The main drive 23 for the mandrel 19 may be employed to rotate the mandrel in either direction. As seen in FIG. 1, the mandrel 19 is in its axially extended and expanded condition. Axially extensible expansible mandrels for uncoiling strip steel are quite conventional and form per se no part of the present invention.

When the mandrel 19 is retracted, the coil 25 may be permitted to roll down the ramp 1 and onto rollers 26 and 27 seen in FIG. 2 which form a coil support on a vertically movable elevator within pit 28. The elevator rollers 26 and 27 which are positioned symmetrically with respect to the vertical plane of the axis of the mandrel ensure that the coil eye or center and the uncoiler mandrel centers may coincide upon the proper elevation of the locating rollers. Also as seen in FIG. 2, a motor 29 may be drivingly connected to hydraulic gear pump or box 30 to supply the necessary power for the elevation of the locating rollers 26 and 27.

When the coil 25 is vertically positioned with the eye and axis of the mandrel aligned, the mandrel in its retracted condition is then axially inserted or extended into the coil eye to the position shown in FIG. 1. The mandrel 19 is then expanded firmly to grip the inside of the coil. The mandrel 19 may then be rotated to place the leading edge of the coil strip at approximately the position indicated by the numeral 32 in FIG. 2 and the piston-cylinder assembly 33 of the peeler unit 3 may then be retracted to pivot the short arm 34 in a counterclockwise direction as viewed in FIG. 3 pivoting the shaft 35 mounted in pillow blocks 36 which have mounted thereon arms 37 supporting peeler roll 38 on brackets 39 projecting from the underside thereof. A motor 40 mounted on the arms 37 may be employed to drive roll 38 through the illustrated belt drive. Also supported on the arms 37 is a bending roll 41 which may be moved by piston-cylinder assemblies 42 toward and away from peeler blade 43. The roll 41 cooperates with the curved portion of the blade 43 and may thus straighten the strip end for threading.

The peeler blade 43 is extensibly mounted on arm 45 by piston-cylinder assembly 46, such arm being mounted on shaft 47 journalled in pillow blocks 48 and having arm 49 secured to the projecting end thereof. The distal end of the arm 49 is connected at 50 to the rod 51 of piston-cylinder assembly 52. Accordingly, the piston-cylinder assembly 52 can be employed to pivot the peeler 43 about the axis of the shaft 47 to bring the peeling point 54 thereof into engagement with the periphery of the coil 25. With the leading edge of the coil 25 at the approximate position designated at 32, the bands confining the coil may then be removed and the roller 38 exerting a pressure on the periphery of the coil will maintain the coil against a clock spring opening and the mandrel 19 may then be rotated in a clockwise direction as viewed in FIGS. 2 and 3 to cause the leading edge of the strip to be peeled from the coil by the blade point 54. The roller 41 may be employed to confine the strip leading edge and to guide the same into the nip of pinch rolls 56 and 57 of the leveler unit 4.

With the peeler blade illustrated, coils wound in either a clockwise or counterclockwise manner as viewed in FIG. 3 may be peeled since the blade point 54 can be positioned beneath the coil and for counterclockwise coils, the leading end can be fed up ramp 59 and into the nip of pinch rolls 56 and 57.

A snubber roll 60 is provided mounted on arms 61 which are pivotally mounted and swung by snubber piston-cylinder assembly 62 mounted in pit 63. The piston-cylinder assembly 62 may then cause the roll 60 to bear against the periphery of the coil and stop the same as the coil rolls into position on rolls 26 and 27. After snubbing, it is retracted and may then work to help straighten the leading coil end in the case of a counterclockwise unwinding as viewed in FIG. 2.

With special reference to FIG. 1, it will be seen that the shafts 35 and 47 extend transversely of both the stand-by line 6 as well as the mill run line 7, but the peeler blade 43 and the arms 37 are provided only on the stand-by line 6 and in no way interfere with the coil or strip material in the mill run line 7.

The strip material is fed from the uncoiler 2 into the stand-by side 6 of the two sided flattener 4 illustrated more clearly in FIGS. 3 and 4. Such flattener 4 includes a drive motor 65 seen in FIG. 1 driving a speed reducer 66 which is drivingly connected to gear box 67 from which flexible drive shafts 68 project driving the various rolls of the flattener. The flattener is mounted on a stand 69 so that the path thereof will be horizontally aligned with the axis of the uncoiler 2 as well as the shear and end welder unit 5.

As seen in FIG. 3, the flattener unit 4 includes in addition to the entrance pinch rolls 56 and 57, exit pinch rolls 70 and 71 as well as a cluster of three flattening rolls which include top rolls 72 and 73 and a bottom roll 74 symmetrically disposed therebetween.

It will, of course, be understood that additional flattening rolls may be included in the unit. Referring now to FIG. 4, it will be seen that each of the bottom rolls 57, 74 and 71 may be split as indicated at 75 for independent speeds on the two sides of the flattener and the upper or top rolls 56, 72, 73 and 70 are paired, one of each pair being for the stand-by and mill run lines, respectively. The bottom split rolls 57 and 71 of the entrance and exit pinch roll units may be fixedly journalled in the side frames 76 and 77 while the center split flattening roll 74 may be journalled in vertically adjustable blocks 78 mounted in such frame walls.

Each of the somewhat shorter eight top rolls are individually mounted in yokes 79 each of which are connected to the rods 80 of piston-cylinder assemblies 81 mounted on top plate 82 bridging the side frames 76 and 77. In this manner there may be eight piston-cylinder assemblies or other means controlling the vertical movement of the eight upper rolls of the leveler unit so that either of the mill run side or the stand-by side can independently be opened and closed.

The run side of the flattener may be idle (not driven) for most applications. However, it will, of course, be understood that the flattener rolls on the mill run side 7 may be driven separately from a drive unit similar to that shown in FIG. 1 on the opposite or left hand side of FIG. 4. In this manner, either the stand-by side or the mill run side can be controlled separately both as to drive or idle and as to raise or lower of the upper flattening rolls. This independent drive-idle and raise-lower arrangement for the stand-by and mill run sides of the flattener provides a better independent control since the mill run side may be used either continuously or only toward the end of a coil, when the radius of curvature decreases, whichever is required by the job. Normally, continuous flattening is not required and the mill run side would be idle, but it could be driven optionally with the apparatus illustrated if required. A signalling device 84 adjacent the coil on the mill run uncoiler mandrel 18 may be employed to sense the decrease in radius of the coil on such mandrel to provide a signal to operate the piston-cylinder assemblies 81 on the mill run side 7 of the flattener so that that side of the flattener would commence its flattening operation.

This independent control of both sides of the flattener permits the leading end of the coil 25 on the stand-by mandrel 19 to be peeled and fed into the flattener so that the leading end of the coil 25 will not have a curve or set therein for the joining operation subsequently to be described. Thus the strip on the stand-by side may be flattened while the strip on the mill run side is either in a flattening condition or an idle condition with the mill run strip being fed therethrough.

From the exit pinch rolls 70 and 71 of the flattener unit 4, the leading edge of the strip from the coil 25 is fed through horizontal split guide rolls 86 and 87 mounted on the entry end of the shear and end welder stand 88 seen in better detail in FIGS. 5 and 6. Such rolls are mounted on upstanding brackets 89 and 90 so that the path therebetween is horizontally aligned with the flattener unit path as well as the openings through shear and end welder clamps 92 and 93 positioned on opposite sides of the shear 94 and the welder 95. The rolls 86 and 87 like the bottom or lower rolls of the flattener unit extend completely transversely across the path of the strip in both the stand-by and mill run lines. The leading end of the strip from the coil 25 is fed through the clamp 92 until the end thereof projects through the shear 94 as indicated at 96. At such time, the strip will be brought to a halt and the clamp 92 may be actuated firmly to grip the strip material in the stand-by line.

During this uncoiling, flattening and clamping of the strip in the stand-by line, a coil 98 on the mill run uncoiler mandrel 18 has been paying off past the peeler 3, through the mill run side of the flattener, and through the shear and end welder unit 5 and the open strip clamp 93 thereon. From the unit 5 the strip in the mill run line proceeds into the loop and from the loop into the mill or processing line. As the trailing end of the strip material from the coil 98 on the mill run side leaves the flattener unit 4 and moves toward the welding unit 5, clamp 93 of the unit 5 may be actuated by a sensing mechanism 99 detecting the lack of presence of strip material so that the clamp will be closed including a special loop clamp (not shown) to cause the material to be fed from the loop to the processing machine. Desirably, the strip on the mill run side will be clamped with its trailing end projecting rearwardly of the shear 94.

Before describing the strip joining process, it will be seen that the stand 88 of the shear and end welder unit 5 includes the entry guide rolls 86 and 87, which are split as seen in FIG. 5 for independent rotation in each line, the stand-by clamp 92, the shear 94, the welding unit 95 and the mill run clamp 93 as well as exit rolls 102 and 103 mounted on brackets 104 and 105. These rolls traverse only the mill run line and serve to guide the strip therein to the loop and then to the processing mill.

Referring now additionally to FIG. 7, it will be seen that each of the clamps 92 and 93 are substantially the same with the exception that the clamp 92 is mounted for movement transversely from the stand-by line to the mill run line and back again in addition to being mounted for movement parallel to the path of the strip. The clamp 92 includes a base plate 107 having four C-shape upstanding plates 108, 109, 110 and 111 thereon having the profile configuration more clearly seen in FIG. 7. Piston-cylinder assemblies 112 and 113 are supported between the plates 108 and 109, 110 and 111, respectively, on plates 114 and 115. The rods of such assemblies are connected to upper vertically movable clamping platens 116 and 117, respectively. A lower vertically fixed clamping platen 118 cooperates therewith and is mounted on upstanding plates 119 secured to the base plate 107. Upstanding side guide rollers 121, 122, 123 and 124 are mounted on laterally adjustable supports 125 and 126.

Such supports extend parallel to the strip edges and thus parallel to the axes of both the stand-by line and mill run line. The supports are mounted on transversely extending guide rods 128 and 129 which extend between fixed supports 130 and 131 projecting from the clamp base plate 107. It is noted that there are two fixed supports 130 between the plates 108 and 109 as well as the plates 110 and 111, respectively. Additional horizontal plate framing may be provided between such C-shape plates as indicated at 132 in FIG. 7. Lateral adjustability of the supports 125 and 126 may be obtained by an adjusting screw 133 having opposite hand threads at each end thereof threadedly engaged with the supports. Such adjusting screw may readily be turned by the application of a turning tool to the projecting end thereof.

The side guide rollers 123 and 124 are mounted on the ends of the support 126 for pivoting movement about horizontal axes formed by the pivotal connection between the pivotal supports 135 and 136 and the opposite ends of the support 126. The members 135 and 136 are pivoted by means of piston-cylinder assemblies 137 and 138, the rods of which are connected to downward and outward projections of the pivotal supports 135 and 136. It is then believed apparent that retraction of the piston-cylinder assemblies 137 and 138 will cause the side guide rollers 123 and 124 to pivot in opposite directions to a horizontal position to clear the plane of the strip supported on the top of the clamp bottom platen 118.

The clamp base plate 107 includes two downwardly projecting transverse plates 140 and 141 through which project guide rods 142 and 143 with slide bushings being provided to facilitate the movement of the clamp plate 107 along such rods. Such rods extend between upstanding end plates 145 and 146 mounted on plate 147. Movement of the clamp along the rods 142 and 143 is obtained by piston-cylinder assembly 149 mounted on the plate 147, the rod of which is connected to the depending transverse plate 141 as at 150.

The plate 147 is provided with depending projections 152 at each corner thereof having slide bushings therein which confine guide rods 153 and 154 extending transversely of the stand 88 and both the stand-by and mill run lines. Such guide rods are mounted in upstanding plates 156 and 157 at the opposite sides of bed plate 158 mounted on the top 159 of the stand 88. Movement of the carriage plate 147 along the guide rods 153 and 154 is obtained by a piston-cylinder assembly 161, the rod of which is connected to a depending bracket 162 fastened to the underside of the plate 147.

It can now be seen that the clamp 92 is mounted on a carriage or base plate 107 which is movable along the guide rods 142 and 143 parallel to the path of the stand-by and mill run lines and such guide rods are in turn mounted on carriage plate 147 which is mounted for movement on guide rods 153 and 154 transversely of the two lines.

The clamp 93 is similar to the clamp 92 and includes a horizontally fixed bottom clamping platen 165, the top surface of which is horizontally aligned with the platen 118 of the clamp 92. Cooperating with such bottom platen are two vertically movable top platens 166 and 167 actuated by piston-cylinder assemblies 168 and 169, respectively. The piston-cylinder assemblies 168 and 169 are supported on a plate 170 supported by the upper inside surface of the C-shape plates 171, 172, 173 and 174. Such C-shaped plates are supported on clamp base plate 176 which corresponds generally to the base plate 107 of the clamp 92.

Side guide rollers 177, 178, 179 and 180 are provided for the strip within the clamp and such rollers are mounted on elongated supports 181 and 182 extending parallel to the path of the strip. Such supports are mounted on transversely extending guide rods 183 and 184 which are mounted on fixed supports 185 and 186 on the base plate 176, the former being two in number between the upstanding C-shaped plates. An adjusting screw 187 may be provided to obtain lateral adjustment of the side guide rollers in the same manner as in the clamp 92.

Depending plates 188 and 189 on the plate 176 are provided with slide bushings enclosing guide rods 190 and 191 extending between stanchions 192 and 193 at the opposite ends of the plate 194 which is supported on shims or blocks 195 in turn mounted on bed plate 196 mounted on the top plate 159 of the stand 88. Movement of the plate 176 along the guide rods 190 and 191 is obtained by a piston-cylinder assembly 198 mounted on plate 194, the rod of which is connected to the depending plate 189 of the plate 176 at 199.

It can now be seen that the clamp 93 is mounted for movement only in the direction of travel of the strip passing therethrough whereas the clamp 92 is mounted for movement in such direction and also normal thereto or transversely of both the stand-by and mill run lines.

Referring now additionally to FIGS. 8, 9 and 10, it will be seen that the shear 94 which extends transversely of both the stand-by and mill run lines is operated by a relatively large diameter piston-cylinder assembly 200 which is mounted on the floor 201 within the stand 88. The rod 202 of the assembly 200 projects upwardly through an aperture 203 in vertically movable bottom head 204 which is connected at each end by the nut fasteners 205 to the posts 206 and 207 which project upwardly through the top plate 159 of the frame 88 and are secured by nuts 209 to the opposite ends of the top shear head 210.

Vertical movement of the bottom head 204 and thus the top head 210 is obtained by links 212 and 213 pivoted at 214 to the rod 202. Such links at their outer ends are pivoted at 215 and 216, respectively, such pivots being the center pivots of toggle linkages interconnecting the fixed top plate 159 and the vertically movable bottom head 204. The pivot 215 also forms the pivotal connection between links 217 and 218 while the pivot 216 also forms the pivotal connection between links 219 and 220. The upper toggle links 217 and 219 are pivotally connected to the fixed top plate 159 of the stand 88 as indicated at 222 and 223, while the lower toggle links 218 and 220 are pivotally connected at 224 and 225, respectively, to straps 226 and 227 which are in turn connected to the bottom head 204.

It can now be seen that retraction of the rod 202 of the piston-cylinder assembly 200 will move the pivot 214 downwardly breaking the toggle linkages as indicated in the phantom line condition in FIG. 9 and conversely, the extension of the rod 202 will move the pivot 214 upwardly to the full line position shown forcing the toggles on the opposite sides thereof into their in-line positions thus moving the top shear head 210 downwardly to effect the required shearing action.

It is noted that the vertically movable shear actuating posts 206 and 207 also pass through top plate 230 or box-like stand 231 supported on bed plate 232 on the stand top 159. A plate 234 is mounted on the plate 230 and supports the bottom shear blades 235 and 236 while the shear head 210 supports the top shear blades 237 and 238. The top shear blades for the stand-by and mill run lines are on opposite sides of the shear head 210 and by the same token the bottom shear blades are also on opposite sides of the head for the respective parallel lines.

The shear head and, of course, the shear blades extend at approximately a 15° angle to a direction normal to the line paths and as the top shear head is moved downwardly by the piston-cylinder assembly 200 through a travel distance of approximately 1½ inches, the strips in both the stand-by and mill run line will be sheared.

The top surface of the plate 234 is horizontally aligned with the bottom clamping platens 118 and 165 of the clamps 92 and 93, respectively, and the plane of such top surface may be termed the cut and clamp line. Cooperating with the plate 234 and parallel to and adjacent the shear head 210 are parallel and slightly spaced welding clamps 240 and 241. Such welding clamps extend transversely of the mill run line 7 only and are secured at each end to vertically movable actuating posts 242 and 243, respectively. Such posts project downwardly through the plates 234 and 230 and are connected to vertically movable bottom heads 244 and 245 which are in turn connected to the rods of piston-cylinder assemblies 246 and 247, respectively, which when extended will actuate the welding clamps 240 and 241.

A welding head 250 is mounted on carriage 251 which is in turn mounted on guide rod 253 and transversing screw 254 which are mounted on brackets 255 and 256. When the strip ends are clamped beneath the welding clamps 240 and 241, the welding head 250 will be traversed across the ends to be welded by a suitable drive mechanism, not shown. Such welding apparatus as shown at 95 is generally conventional and forms per se no part of the present invention.

In the illustrated embodiment, for a butted or lapped strip joint, TIG (tungsten inert gas) welding may be employed or for a gapped joint MIG (metal inert gas) welding can be used. It will, of course, be appreciated that other types of strip joining techniques may be employed depending primarily on the type of material used and the subsequent processing required.

It can now be seen that the clamp 92 which is mounted for movement both laterally and forwardly on the mill run side can be employed to move the strip from the stand-by line to the mill run line. When such transfer takes place, the coil 25 seen in FIG. 1 will be pushed off of the stand-by mandrel 19 onto the mill run mandrel 18 axially aligned therewith. Expansion and collapse of the mandrel shoes, being separately controllable, can be arranged so that the receiver mandrel 18 collapses slightly more than the stand-by mandrel 19. The pushing of the coil from the mandrel 19 to the mandrel 18 is accomplished by the pusher plate 260, the profile of which is shown in FIG. 2. The pusher plate 260 may be actuated by a pair of hydraulic piston-cylinder assemblies shown at 261 and 262 to cause the coil on the mandrel 19 to move axially to the mandrel 18. The mandrel 18 will, of course, be clear with the trailing end of the stock in the mill run line clamped by the clamp 93. The pusher plate 260 and the clamp 92 are sufficient in the illustrated embodiment to transfer the strip in the stand-by line to the mill run line, but it will be appreciated that additional transfer clamps may be provided.

The piston-cylinder assemblies 81 of the flattener 4 will, of course, all be retracted to open the pass thereof for such transfer. Such opening of the flattener may be accomplished by the signal means 99.

OPERATION

With three coils of strip material in the storage ramp 1, and with the mandrel 19 axially retracted, a coil may be released to roll down onto the elevator rollers 26 and 27 and the elevator mechanism may then be actuated to align the coil eye with the center of the mandrel 19. The mandrel 19 then moves into the coil and is expanded firmly to grip the I.D. thereof. The peeler blade 43 and the associated peeler rolls are then actuated to peel the strip material from the coil from either the top or bottom depending upon whether or not the coil is wound in a clockwise or counterclockwise direction. The leading end of the strip is then fed through the stand-by side of the flattener 4 which may perform a flattening operation thereon and from the flattener the leading edge of the strip is fed through the clamp 92 and into the open shear 94 so that the edge projects slightly therebeyond. Since both the uncoiler 2 and the flattener 4 are power driven, the strip may readily thus be fed into the unit 5 and when properly positioned, clamp 92 can be closed.

All during this period, the coil on the mill run side 7 has been paying off past the peeler, through the mill run side of the flattener 4, through the open shear 94, welding unit 95, and clamp 92 and into the loop and from there to the forming or processing line. As the coil 98 on the mill run side approaches a certain diameter, the signal 84 may actuate the piston-cylinder assemblies 81 on the mill run side of the leveler to flatten the strip due to the small radius of curvature and the set in the strip material. The trailing end of the strip material will then leave the uncoiler 2, pass through the peeler station, and through the leveler 4. As the trailing end of the strip leaves the flattener 4, the signal 99, sensing a lack of presence of the strip material, may be employed to actuate clamp 93 and a further clamp, not shown, associated with the loop so that the processing line will begin taking the material from the loop. The signal 99 may also open fully both sides of the flattener unit 4.

With the clamps 92 and 93 now firmly gripping the strip in both the stand-by and mill run lines, the shear 94 is actuated and cuts both strips at about the 15° angle illustrated. The scrap strip ends are removed from the unit 5 and the clamp 93 is indexed by the piston-cylinder assembly 198 to move the sheared trailing end of the mill run strip to the proper position beneath the weld clamp 241. When this position of the one member to be joined is obtained, the strip in the stand-by line will be bodily laterally moved to the mill run line by actuation of the piston-cylinder assembly 161 of the clamp 92 and the piston-cylinder assemblies 261 and 262 of the pusher plate 260. The peeler mechanism will, of course, be positioned to permit such transfer and as aforesaid, the mandrel 18 will be collapsed to a slightly greater degree than the mandrel 19.

With the stand-by strip now positioned in the mill run line by the pusher plate 260 and the lateral movement of the clamp 92, the leading end of the stand-by strip is then indexed forwardly by actuation of the piston-cylinder assembly 149 to position the leading edge to be joined beneath the welding clamp 240. It will be appreciated that the extent of travel of the piston-cylinder assembly 149 may be employed to control the gap between the strip ends to form either a butted or gapped joint therebetween. With the strip ends thus precisely positioned beneath the weld clamps 240 and 241, the piston-cylinder assemblies 246 and 247 are actuated to clamp the strip ends adjacent the joint to be formed and the welding head 250 traversed to join quickly by welding the two strip ends. With the welding operation complete, the piston-cylinder assemblies 137 and 138 are retracted to pivot the side guide rollers 123 and 124 to a position beneath the plane of the strip so that the piston-cylinder assembly 161 may be retracted to place the clamp 92 when released back in the stand-by line 6. The mandrel 18 will be expanded, the pusher plate 260 retracted, the clamp 93 released, and also the welding clamps 240 and 241 released to permit the strip material in the coil now on the mill run line to be fed by a pair of pinch rolls, running at a speed higher than line speed, into the loop until the loop is refilled.

The mandrel 19 will now be axially retracted and the piston-cylinder assemblies 137 and 138 will be extended with the clamp 92 repositioned on the stand-by line 6 so that the next coil may be positioned, uncoiled, peeled, flattened, and to be clamped by the clamp 92 with the leading end thereof projecting into the open shear 94. There the strip will remain until the time again arrives to transfer the same to the mill run line and join the leading end thereof to the trailing end of the stock in the line.

It can readily be seen that the uncoiling, peeling, and initial flattening of the strip, as well as the positioning of the strip for shear all takes place while the strip in the mill run line is being payed from the coil. Material need be payed from the loop only for the time required to clamp, shear, transfer, weld, and unclamp. In this manner, the entire transfer and joining operation may be accomplished in approximately 10 seconds as compared to about 10 minutes with conventional equipment employing much manual labor. Accordingly, the mill can run continuously at higher speeds and loop equipment of smaller capacity can be employed.

Other modes of applying the principle of the invention may be employed, change being made as regards the details described, provided the features stated in any of the following claims or the equivalent of such be employed.

I, therefore, particularly point out and distinctly claim as my invention:

1. A method of joining strip stock ends in a strip processing line comprising the steps of feeding the leading edge of strip stock into a stand-by line laterally adjacent and parallel to such processing line, clamping such leading edge to a transfer carriage, clamping the trailing edge of the strip stock within such processing line, and laterally shifting such transfer carriage from such stand-by line to a position in line with such processing line to index such leading edge to a position to be joined to such trailing edge, joining such leading and trailing edges, and unclamping such strip stock.

2. The method of claim 1 including the step of clamping the trailing edge of the strip stock to a second transfer carriage, and shifting both carriages to position the leading and trailing edges for joining.

3. The method of claim 2 including the step of shearing such leading and trailing edges between such carriages simultaneously prior to such lateral shifting of such first mentioned carriage.

4. The method of claim 3 including the steps of indexing such first mentioned carriage laterally and forwardly and such second carriage forwardly after such shearing to position such sheared ends for joining.

5. The method of claim 1 including the step of shearing such leading and trailing edges simultaneously prior to such lateral shifting.

6. A method for joining coiled stock strip ends in a strip processing line comprising the steps of feeding a first strip stock from a coil to such line, uncoiling a second strip stock parallel to the first with the coil thereof coaxial with the coil of the first, clamping the leading edge of the second, clamping the trailing edge of the first, and laterally shifting the second, coil and all, to such processing line, and indexing the clamped ends to be joined.

7. The method of claim 6 including the step of shearing the clamped ends of both the first and second simultaneously prior to such lateral shifting.

8. The method of claim 6 including the step of joining the strip ends and unclamping the same after such lateral shifting.

9. The method of claim 6 including the step of pushing the coil of the second from one expansible mandrel to another axially aligned therewith during such lateral shifting.

10. In a strip processing line for coiled stock including a coil mandrel from which such stock is payed into such line, a stand-by line parallel to such processing line including an axially movable expansible mandrel adapted to receive the next coil of stock for such line, means for loading such next coil onto said expansible mandrel, means for peeling such stock therefrom, means for clamping the leading end of such stock thus peeled, and means for laterally shifting such next coil and the stock peeled therefrom from said stand-by line to said processing line.

11. A line as set forth in claim 10 including means for clamping the trailing end of the stock in said processing line laterally adjacent the clamped leading end of the stock in said stand-by line whereby such leading and trailing ends may be joined after such lateral shifting.

12. A line as set forth in claim 10 wherein said last mentioned means comprises a carriage to shift the clamped leading end of such stock and a pusher to push the coil from one mandrel to the other.

13. A line as set forth in claim 10 including a two sided flattener straddling both lines, and means optionally to flatten the strip in either line.

14. A line as set forth in claim 10 including a two sided flattener straddling both lines, bottom rolls in said flattener extending transversely of said lines and split therebetween for independent line rotation, paired top rolls in said flattener, one of each pair extending above the respective lines, means independently for raising and lowering each top roll, and means independently for driving each top roll.

15. A strip joining unit for strip in parallel side-by-side mill lines comprising a strip clamp operative to clamp the leading end of the strip in one line, a second strip clamp operative to clamp the trailing end of the strip in the other line, strip joining means, respective carriages for said strip clamps, and carriage indexing means for both said carriages operative to laterally shift such leading end of such strip from one line to the other and position said ends for joining by said strip joining means.

16. A strip joining unit as set forth in claim 15 wherein said carriage for the clamp for such one line is mounted for movement transversely of such lines and coaxially of such other line to shift and move coaxially the strip in such one line and means for moving said last mentioned carriage as aforesaid.

17. A strip joining unit as set forth in claim 16 wherein said carriage for the clamp for such other line is mounted for movement parallel to said lines only, and means for moving said last mentioned carriage as aforesaid.

18. A strip joining unit as set forth in claim 16 including side guide rollers for said clamp for such one line, said rollers on the side toward such other line being retractible for repositioning of the clamp after joining of the strip ends, and means for retracting said last mentioned rollers.

19. A strip joining unit as set forth in claim 15 including a shear extending transversely of both lines between said clamps, and means for actuating said shear to sever the strip in both lines simultaneously.

20. In a strip processing line, parallel horizontally spaced strip lines at the entry end thereof, means for transferring strip from one line to the other, and means to join the leading end of the transferred strip to the trailing end of strip in the other.

21. A strip processing line as set forth in claim 20 including means for peeling the strip in said one line from a coil while the strip in the other line is being fed from a coil into the other line, the coils of each strip being coaxial.

22. A strip processing line as set forth in claim 21 including means for axially pushing the coil from said one line to the other when the coil in the other is depleted.

23. A strip processing line as set forth in claim 22 including first clamp means for the leading end of the strip in said one line, and second clamp means for the trailing end of the strip in the other.

24. A strip processing line as set forth in claim 23 including means for indexing said first clamp means to assist such transfer, and for indexing both said clamp means for positioning the ends for joining.

25. A strip processing line as set forth in claim 24 including means to shear the strip ends in both lines simultaneously after clamping and prior to indexing.

26. A strip processing line as set forth in claim 22 including opposed expansible mandrels supporting the coils in both lines.

27. A strip processing line as set forth in claim 26 wherein the mandrel for said one line is axially retractible and when extended is nose-to-nose with the other.

28. A method of joining strip stock ends in a strip processing line comprising the steps of feeding the leading edge of strip stock into a stand-by line adjacent and parallel to such processing line, clamping such leading edge to a transfer carriage, clamping the trailing edge of the strip stock within such processing line, and laterally shifting such transfer carriage to a position in line with such processing line to index such leading edge to a position to be joined to such trailing edge, joining such leading and trailing edges, and unclamping such strip stock; such stock being fed to such stand-by and processing lines in coil form, and shifting simultaneously with the shifting of such transfer carriage the coil form from such stand-by to such processing line.

References Cited

UNITED STATES PATENTS

| | | | |
|---|---|---|---|
| 2,978,805 | 4/1961 | Greenberger | 219—82 |
| 3,021,416 | 2/1962 | Mallet et al. | 219—82 |
| 3,191,843 | 6/1965 | Tomkins | 228—5 |
| 3,198,413 | 8/1965 | Cooper | 228—4 |
| 3,247,354 | 4/1966 | Mallet et al. | 217—82 |

RICHARD H. EANES, JR., *Primary Examiner.*